United States Patent [19]

Nagata et al.

[11] Patent Number: 4,910,511

[45] Date of Patent: Mar. 20, 1990

[54] RADIO PAGER HAVING LOCAL- AND WIDE-AREA RECEPTION MODES

[75] Inventors: Koichi Nagata; Yohichiro Minami, both of Tokyo, Japan

[73] Assignee: NEC Corporation, Japan

[21] Appl. No.: 848,320

[22] Filed: Apr. 4, 1986

[30] Foreign Application Priority Data

Apr. 6, 1985 [JP] Japan .................................. 60-73239

[51] Int. Cl.⁴ .............................................. G08B 5/22
[52] U.S. Cl. ......................... 340/825.440; 340/825.52; 455/38
[58] Field of Search ...................... 340/825.04, 825.44, 340/825.48, 331.1, 825.52; 455/34, 38, 179, 228; 371/37, 39, 40, 41; 379/56, 57

[56] References Cited

U.S. PATENT DOCUMENTS

| | | | |
|---|---|---|---|
| 3,078,443 | 2/1963 | Rose | 371/41 |
| 3,648,236 | 3/1972 | Burton | 371/37 |
| 3,808,367 | 4/1974 | Wigner et al. | 375/55 |
| 3,836,974 | 9/1974 | Wells | 340/311.1 |
| 3,851,251 | 11/1974 | Wigner et al. | 455/38 |
| 3,983,536 | 9/1976 | Telfer | 371/37 |
| 4,249,165 | 2/1981 | Mori | 340/825.44 |
| 4,353,065 | 10/1982 | Mori | 340/825.44 |
| 4,403,212 | 9/1983 | Masaki | 340/311.1 |
| 4,471,352 | 9/1984 | Soulliard et al. | 340/825.44 |
| 4,518,961 | 5/1985 | Davis et al. | 340/311.1 |
| 4,644,347 | 2/1987 | Lucas et al. | 340/825.44 |
| 4,734,694 | 3/1988 | Umetsu et al. | 340/825.44 |

FOREIGN PATENT DOCUMENTS 2147176A 5/1985 United Kingdom .
2164218 3/1986 United Kingdom ........... 340/825.44
2173660 10/1986 United Kingdom ........... 340/825.44
2177244 1/1987 United Kingdom ........... 340/825.48

OTHER PUBLICATIONS

Shu Lin, An Introduction to Error-Correcting Codes, 07/1972, pp. 112-139 (Ch. 6).

Watanabe et al, "Commercial Test Results on New Radio Paging System", Jpn. Telecommun. Rev, vol. 21, No. 2, 4/79, pp. 144-148.

NEC. Res. & Develop., No. 68, Jan. 1983, "Digital Display Radio Paging System", by Nagata et al, pp. 16-23.

"A Standard Code for Radiopaging", British Post Office, Jun., 1978.

Primary Examiner—Donald J. Yusko
Assistant Examiner—Edwin C. Holloway, III
Attorney, Agent, or Firm—Laff, Whitesel, Conte & Saret

[57] ABSTRACT

In a radio paging system, radio paging signals contain a BCH (31, 16) format address and a BCH (31, 21) format address which are sent from a central station. The paper is assigned first and second BCH format user identification codes corresponding respectively to the BCH (31, 16) and BCH (31, 21) addresses. The pager has mode select switches for selecting the BCH (31, 16) address for local area reception or BCH (31, 21) address for wide area reception. When a paging signal is received, a coincidence is detected between the selected address and the corresponding BCH user identification code. When the coincidence is detected, the user is alerted to the reception by a paging signal. An appropriate channel is established in the local or wide service area.

6 Claims, 3 Drawing Sheets

RADIO PAGER HAVING LOCAL- AND WIDE-AREA RECEPTION MODES

BACKGROUND OF THE INVENTION

The present invention relates to a radio pager which is capable of operation in a local-area reception mode and in a wide-area reception mode.

Conventional radio pagers are assigned with an identification code representing the user's idendification number. The identification code is in the Bose-Chaudhuri-Hocquenghem (31,16) format for a given local area and transmitted on a specified radio frequency channel. The total number of subscribers available with the BCH (31,16) code format is 65,536. Therefore, if the number of subscribers exceeds the limit, an extra radio frequency channel is required to accommodate new subscribers and this procedure must be repeated in units of 65,625 new subscribers.

SUMMARY OF THE INVENTION

It is therefore an object of the present invention to provide a radio pager which permits efficient utilization of radio frequency channels.

According to the present invention, a pager transmitting station sends paging signals for each called party on first and second channels for local and wide area services, respectively. The paging signal transmitted on the first channel contains an address signal in a first prescribed code format and the paging signal transmitted on the second channel contains an address signal in a second code format, each address signal representing the same identification number assigned to a user of the paging system.

A radio pager according to the invention comprises a manually controlled channel selector for selecting the first channel to operate the pager in a local area reception mode when the user is in the local area and selecting the second channel to operate the pager in a wide area reception mode when the user is outside of the local area. A receiving circuit is responsive to the selector for receiving a first paging signal transmitted on the first channel and receiving a second paging signal transmitted on the second channel, each of the paging signals containing an address signal of the particular code format. A decoder is responsive to the manual selector for comparing the address signal of the first paging signal with an identification signal representing a user's first identification number in the first code format when the first channel is selected and comparing the address signal of the second paging signal with an identification signal representing a user's second identification number in the second code format. The decoder generates a coincidence signal when each address signal coincides with the associated identification signal. An audible tone is generated in response to the coincidence signal to call the attention of the user to the reception of a message from a caller. Preferably, the user's first identification number is the same as the user's second identification number. In a further preferred form of the invention, the second code format has a greater number of code bits than the number of code bits available with the first code format.

Preferably, the first code format for local-area reception mode is the BCH (L, M) code format and the second code format for wide-area reception mode is the BCH (L, N) code format (where $L > N > M$).

In a further preferred embodiment, the address signal in the BCH (L, M) code format undergoes two-bit error corrections and the address signal in the BCH (L, N) code format undergoes 1-bit error correction.

BRIEF DESCRIPTION OF THE DRAWINGS

The present invention will be described in further detail with reference to the accompanying drawings, in which.

DETAILED DESCRIPTION

Figure 1:
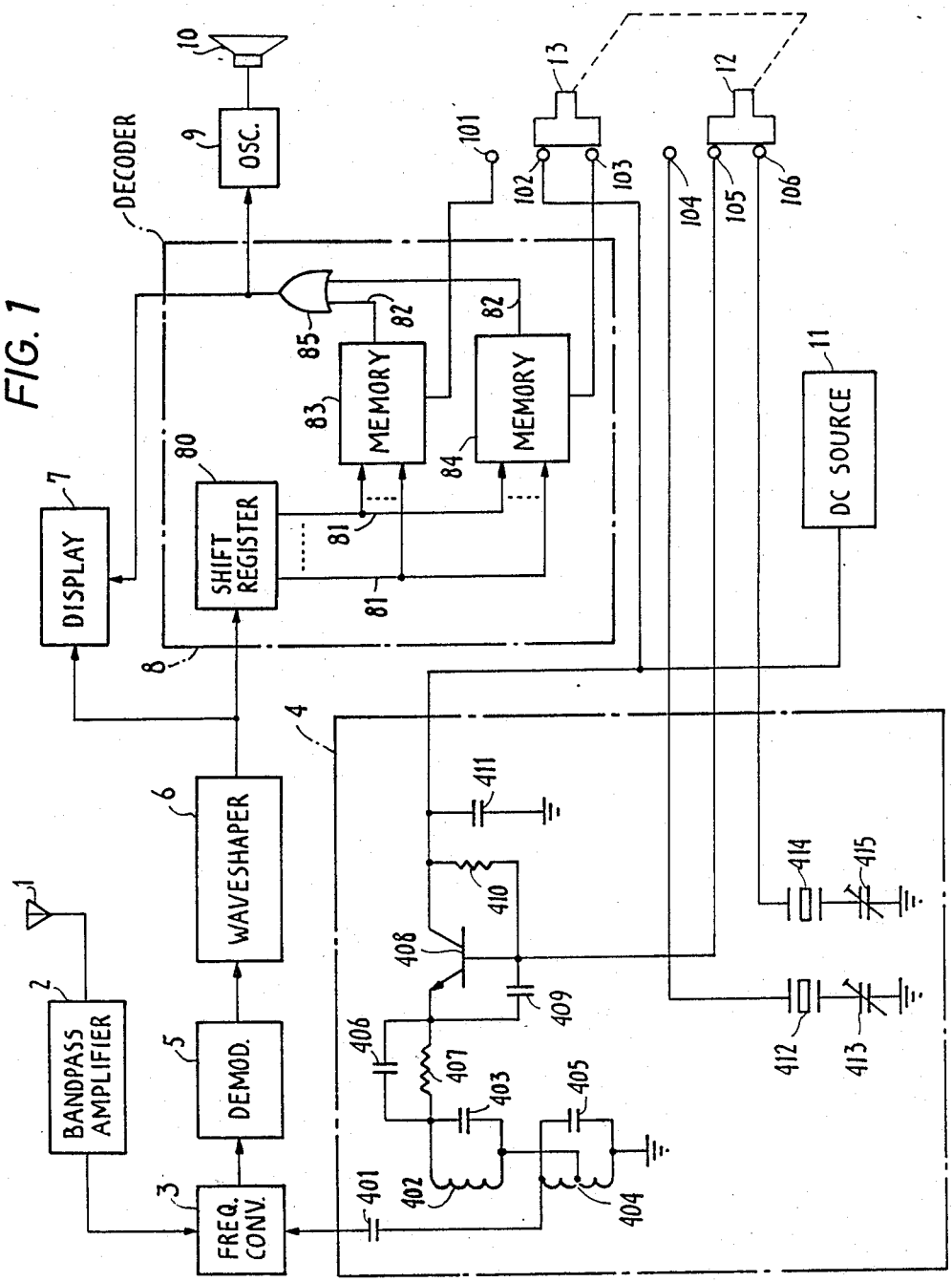
FIG. 1 is a block diagram of a radio pager according to a preferred embodiment of the invention.

Referring to FIG. 1, there is shown a multi-channel radio paging receiver, or pager according to the present invention. In FIG. 1, first and second paging signals are frequency-modulated respectively upon first and second channels and transmitted from a transmitting station for local and wide area services, respectively. Each paging signal comprises a selective calling address signal and a message signal. The address signal of the first paging signal is in the Bose-Chaudhuri-Hocquenghem (31, 16) code format for local area service and the address signal of the second paging signal is in the BCH (31, 21) code format for wide area service. The total capacity of codes that can be transmitted on the first channel for local area reception is 65,536, whereas the total capacity of codes that can be transmitted on the second channel for wide area reception is 2,097,152, a value 32 times greater than that available for local-area service. This is best understood by analyzing the BCH (31, 21) code and BCH (31, 16) code as follows. Let it be assumed that generator polynominals are represented by:

$$M_1(x) = x^5 + x^2 + 1$$

$$M_3(x) = x^5 + x^4 + x^3 + x^2 + 1$$

$$M_5(x) = x^5 + x^4 + x^2 + x + 1$$

then the generator polynomial of the BCH (31, 21) code is given by:

$$M_1(x) \times M_3(x) = x^{10} + x^9 + x^8 + x^6 + x^5 + x^3 + 1$$

and the generator polynomial of the BCH (31, 16) code is given by:

$$M_1(x) \times M_3(x) \times M_5(x) = x^{15} + x^{11} + x^{10} + x^9 + x^8 + x^7 + x^5 + x^3 + x^2 + x + 1$$

Since $M_1(x) \times M_3(x)$ is a common term of the two generator polynominals, the BCH (31, 16) code is a part of the BCH (31, 21) code.

The paging signal is intercepted by an antenna 1, filtered through a band-pass amplifier 2 and fed to a frequency converter 3 to which is also applied the output of a variable frequency local oscillator 4. The radio-frequency signal is transposed to an intermediate-frequency signal by the frequency converter 3 and fed to a frequency demodulator 5 and thence to a waveshaper 6. Waveshaper 6 comprises a low-pass filter for eliminating undesirable high frequency components of the demodulated signal and a comparator for comparing the output of the low-pass filter with a threshold to generate a digital signal which is a replica of the original signal comprising a message signal preceded by a selective calling signal. The output of waveshaper 6 is connected to a display unit 7 and to a decoder 8 which decodes the address signal by comparing it with an identification code and activates an audio-frequency oscillator 9 to generate an audible tone by a loudspeaker 10 when the address signal coincides with the identification code. Display unit 7 essentially comprises a message decoder and a liquid-crystal display to provide a visual display of a message following an address signal. A user carrying the pager is thus alerted of the reception of a page from a caller.

Variable frequency local oscillator 4 includes a crystal-controlled Colpitts circuit which is formed by a transformer 402 in parallel with a capacitor 403, the transformer being coupled by a parallel circuit of a bypass capacitor 406 and a biasing resistor 407 to the emitter of transistor 408. The emitter of transistor 408 is further coupled to its base by a capacitor 409 and the collector of transistor 408 is connected by a bypass capacitor 411 to ground, by a biasing resistor 410 to its base and directly to a DC voltage source 11. The base of transistor 408 is connected through a local-area selecting circuit to a series of a quartz crystal 414 and a variable capacitor 415 and through a wide-area selecting circuit to a series of a quartz crystal 412 and a variable capacitor 413.

A high-frequency tuning circuit is formed by a transformer 404 and a capacitor 405 connected in parallel therewith. The high-frequency tuning transformer 404 has one end connected through a coupling capacitor 401 to the frequency converter 3. Transformer 402 is connected through an intermediate tap of transformer 404 to ground.

The operating parameters of the local oscillator are determined so that the combined impedance of the two tuning circuits as seen from across the emitter of transistor 408 and ground is capacitive in the variable range of frequencies generated by quartz crystals 412 and 414. In a practical embodiment, each of the quartz cyrstals has an oscillating frequency which is ½ of the difference in frequency between the frequency of the respective channel and the intermediate frequency.

The local-area selecting circuit is established when a first area-selecting switch 12 couples the quartz crystal 414 through contacts 106 and 105 to the base of transistor 408 and the wide-area selecting circuit is established when the switch 12 is moved to a position connecting the quartz crystal 412 through contacts 105 and 104 to the base of the transistor.

Decoder 8 comprises a shift register 80 having 31 bit positions into which the address code is sequentially stored, and a local-area memory 84 and a wide-area memory 83. Local-area memory 84 is enabled by DC voltage source 11 when a second area-selecting switch 13, which is ganged to switch 12, couples the DC source thereto through contacts 102 and 103 and memory 83 is enabled by DC voltage source 11 when the second switch 13 is moved to a position connecting the source voltage thereto through contacts 102 and 101. Each of the memories 83 and 84 has memory cells corresponding in number to the bit positions of shift register 80.

Figure 2:
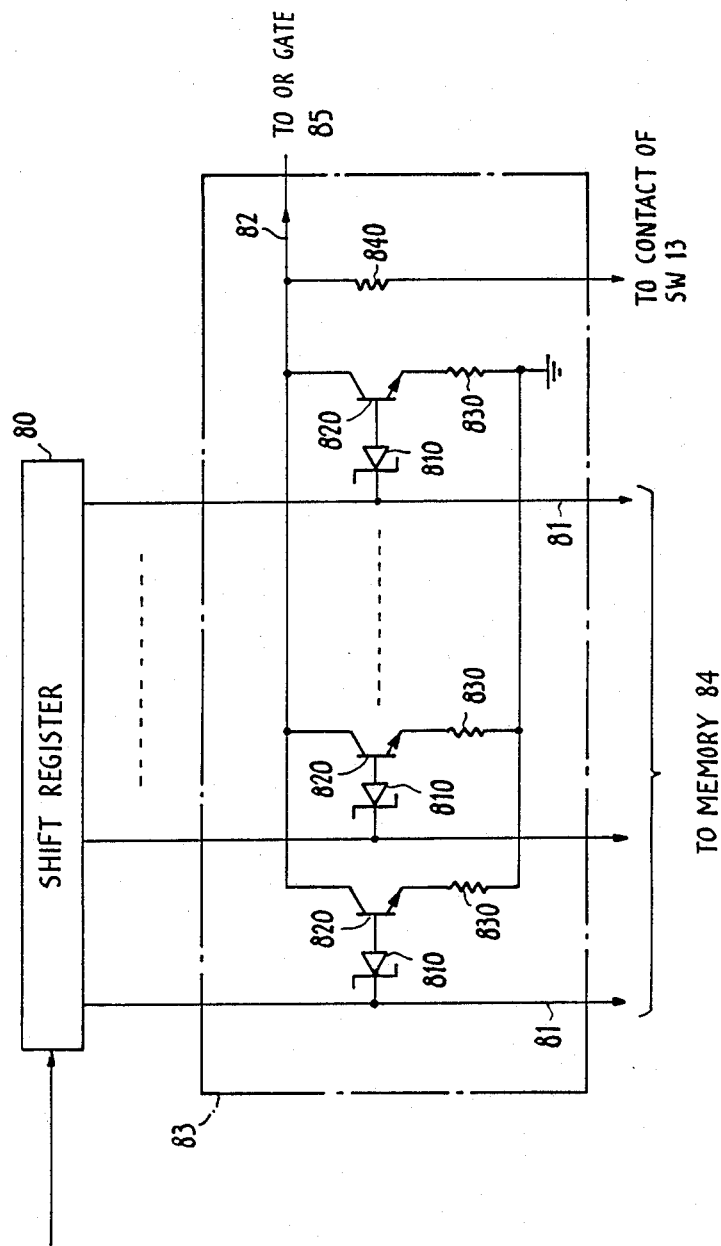
FIG. 2 is an illustration of details of the wide-area memory of FIG. 1.

As shown in FIG. 2, each memory cell of memories 83 and 84 is formed by a Zener diode 810, a transistor 820, and a protection resistor 830. Each Zener diode has its cathode connected to an associated input bit line 81 and its anode connected to the base of the associated transistor. Each of the transistors 820 has its collector coupled to a common output line 82 and to contact 101 or 103 through a common resistor 840 and has its emitter connected through the respective resistor 830 to ground.

The user's identification code bits are stored into memory cells by destroying particular Zener diodes to transform them into mere resistance elements. This is accomplished by applying a high positive DC potential to associated input bit lines 81 and a negative DC potential to an output line 82. Resistors 830 serve as a means for protecting the associated transistor from being damaged by the high DC potential. An identification number assigned to the user in the BCH (31,16) code format is stored in local-area memory 84 and the same identification number in the BCH (31,21) code format is stored in wide-area memory 83.

When a logical "1" input is applied, the memory cell having a destroyed Zener diode develops a logical "0" output at the collector of the associated transistor and the memory cell having a non-destroyed Zener diode develops a logical "1" output, and when a logical "0" input is applied, the memory cell having a destroyed Zener diode develops a logical "1" output and the cell having a non-destroyed Zener diode develops a logical "0" output. Since the transistors 820 of all cells of each memory are connected in parallel, they establish an AND gate to produce a logical "1" output at the output line 82 when there is a one-to-one coincidence between the address code and identification code. The coincidence output from each memory is coupled by an OR gate 85 to oscillator 9 to activate the speaker 10 and to a control terminal of the display unit 7 to provide a display of a message signal following the address signal.

From the transmitting station, two paging signals respectively having BCH (31,16) and BCH (31,21) formatted address signals are respectively transmitted on the local-area channel and wide-area channel. When the user is in his own local service area, switches 12 and 13 are positioned so that quartz crystal 414 and memory 84 are enabled. Oscillator 4 is tuned to the local-area channel to check the BCH (31,16) address signal transmitted on the local-area channel against the BCH (31,16) identification code stored in memory 84. When the user enters the wide service area, switches 12 and 13 are moved to wide-area service positions so that quartz crystal 412 and memory 83 are enabled. Oscillator 4 is tuned to receive the wide-area channel to decode the BCH (31,21) address signal transmitted on the wide-area channel by comparing it with the BCH (31,21) identification code stored in memory 83.

Figure 3:
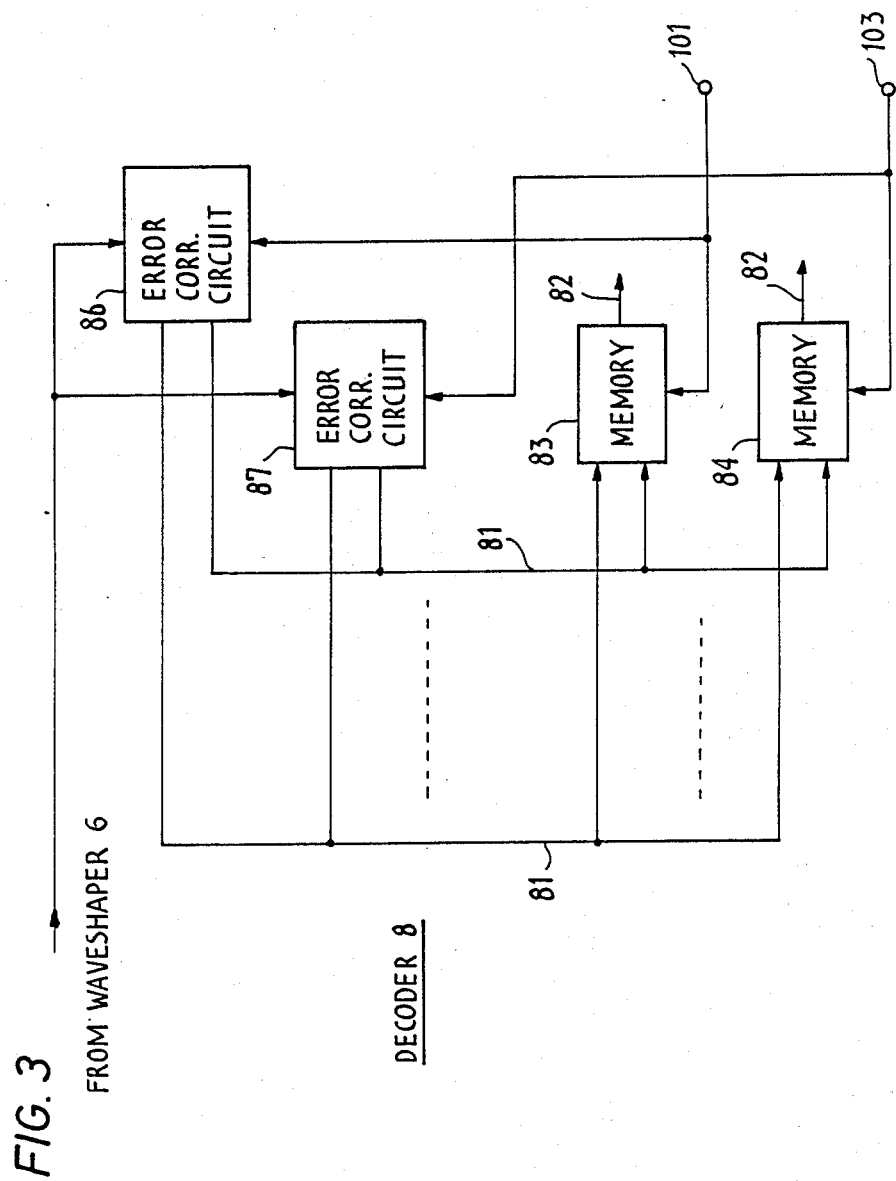
FIG. 3 is a block diagram of a modified embodiment of the invention.

It is preferred that error correction circuits be provided respectively for correcting errors in the address signals of the BCH (31, 21) and BCH (31,16) code formats. In FIG. 3, a 1-bit error correction circuit 86 and a 2-bit error correction circuit 87 are provided to receive the output of waveshaper 6. Each error correction circuit includes a buffer, or shift register into which the received address signal is sequentially loaded in a manner as it is loaded into the shift register of FIG. 2. The address bits stored in the shift register undergo an error correction process as disclosed in U.S. Pat. No. 4,194,153 issued to Masaki et al, titled "Digital Radio Paging Communication Receiver". The 1-bit error correction circuit 86 is connected to the contact 101 so that it is enabled simultaneously with memory 83 during wide-area reception mode and the 2-bit error correction circuit 87 is connected to the contact 103 to be enabled with memory 84 during local-area reception mode. During local-area reception mode, 2-bit error correction is performed by circuit 87 on the address signal of the BCH (31, 16) code format and during wide-area reception mode, 1-bit error correction is performed by circuit 86 on the address signal of the BCH (31, 21) code format. The error-corrected 31-bit address signals are applied from error correction circuits 86 and 87 are respectively applied to memories 83 and 84 on input lines 81.

What is claimed is:

1. A radio pager comprising: manually controlled channel selecting means for selecting a first channel to operate the pager in a local area reception mode and for selecting a second channel to operate the pager in a wide area reception mode;

receiving means responsive to said channel selecting means for receiving a first paging signal which is transmitted on the first channel and for receiving a second paging signal transmitted on the second channel, said first paging signal containing an address in a Bose-Chaudhuri-Hocquenghem ("BCH") (L, M) code format and said second paging signal containing an address in a BCH (L, N) code format, where $L>N>M$;

a shift register having L-bit positions in which the address of either the received first or second paging signal is sequentially stored;

first and second memories respectively operable during said local area reception mode and wide area reception mode, said first and second memories having L-bit memory elements coupled respectively to the L-bit positions of said shift register and memorizing a user's first identification number in said BCH (L,M) code format and a user's second identification number in said BCH (L,N) code format, respectively, and for generating a coincidence signal as an indication of a reception of said first or second paging signal when the address stored in said shift register coincides with one of said user's identification numbers in said first and second memories;

a first error correction circuit which is operable during said local area reception mode for providing "i"-bit error correction of the address of said first paging signal; and a second error correction circuit which is operable during said wide area reception mode for providing "j"-bit error correction of the address of said second paging signal, where "j" is smaller than "i".

2. A radio pager as claimed in claim 1, wherein L, M and N are 31, 16 and 21, respectively.

3. A radio pager as claimed in claim 2, wherein "i"- and "j"-bit error corrections are 2-bit and 1-bit error corrections, respectively.

4. A radio pager as claimed in claim 1, wherein "i"- and "j"-bit error corrections are 2-bit and 1-bit error corrections, respectively.

5. A radio pages as claimed in claim 1, further comprising means for decoding said first and second paging signals into corresponding display signals in response to said coincidence signal from said first and second memories and means for displaying said display signals.

6. A radio pager as claimed in claim 1, wherein the memory elements of each of said first and second memories comprise a plurality of breakdown diodes and a plurality of transistors forming a plurality of sets with said breakdown diodes, wherein certain of said breakdown diodes is destroyed in accordance with one of said user's identification numbers, a first electrode of the breakdown diode of each of the sets being connected to a corresponding one of the L-bit positions of the shift register, and the transistor of the set having a control electrode connected to a second electrode of the breakdown diode of the set and having controlled electrodes biased to produce an output signal when a coincidence occurs between a binary state of the breakdown diode of the set and a binary state of the corresponding bit position of the shift register.

* * * * *